United States Patent
Hubbard et al.

[15] 3,643,407
[45] Feb. 22, 1972

[54] AUTOMATIC HEIGHT ADJUSTMENT OF CROP HARVESTER

[72] Inventors: Arthur Lowell Hubbard; Leon Franklin Sanderson, both of Des Moines, Iowa

[73] Assignee: Deere & Company, Moline, Ill.

[22] Filed: Oct. 26, 1970

[21] Appl. No.: 83,769

[52] U.S. Cl. ................................. 56/10.2, 56/10.9, 50/208
[51] Int. Cl. .............................................................. A01d 45/18
[58] Field of Search ............ 56/10.2, 10.4, 10.9, 208, DIG. 15

[56] References Cited

UNITED STATES PATENTS 2,972,847   2/1961   Matthews, Jr. ..................... 56/10.9 X
3,196,599   7/1965   Meiners et al. ........................ 56/10.2

Primary Examiner—Louis G. Mancene
Assistant Examiner—J. N. Eskovitz
Attorney—H. Vincent Harsha, Harold M. Knoth, William A. Murray, John M. Nolan and Raymond L. Hollister

[57] ABSTRACT

A crop harvester, particularly of a cotton-picker-type in which the row unit is suspended on a main supporting structure to rock about a transverse axis and in which there is provided a hydraulic motor for rocking the unit so as to raise and lower the forward end which is controlled by a ground-sensing device at the forward end of the row unit. The unit is further characterized by having a hydraulic cylinder which will raise and lower the structure suspending the unit and the hydraulic cylinder is controlled through a valve and mechanical linkage connection to the row unit that actuates the latter hydraulic cylinder upon the row unit being rocked beyond a predetermined range of movement.

20 Claims, 4 Drawing Figures

INVENTORS
ARTHUR L. HUBBARD
LEON F. SANDERSON

BY

William A. Murray
ATTORNEY

AUTOMATIC HEIGHT ADJUSTMENT OF CROP HARVESTER

BACKGROUND OF THE INVENTION

It has heretofore been known to provide a hydraulic lift system for raising and lowering harvesters and particularly cotton harvesters about horizontal supporting axes and to control the extension and retraction of the hydraulic cylinder creating the lifting action by means of a ground-engaging shoe that is movable relative to the harvesters and adjusts a valve for the hydraulic cylinder. The shoe in such systems senses the ground level and raises and lowers the unit in accordance with the ground surface.

One of the problems that exists with the aforedescribed automatic self-positioning mechanism is that when used in a cotton picker and the latter is on the go, the spindles of the picker are always within the plants. Therefore, should the shoe or ground feeler sense an obstruction, it forces the entire harvesting unit upwardly thereby shredding the plant and creating an improper picking of cotton from the plant. A similar condition exists should the shoe fall in a low ground area. The automatic height sensing, therefore, moves the harvesting unit vertically through the plants which is considered bad practice.

A further problem that exists with the aforedescribed type of automatic height position lies in the fact that the harvesting units are relatively heavy and consequently considerable power is required to raise the units. Since they are raised hydraulically and since the shoe or ground feeler senses every variation in the ground, the cylinders are constantly in operation. Due to the work load in raising the harvesting units, the oil pressure and volume of oil used remains relatively high. This creates a considerable work load on the engine and also creates a heating problem in the hydraulic system. Therefore, provision must be made to provide the additional power for operating the hydraulic system as well as reducing or minimizing the heat that is created in the hydraulic system.

SUMMARY OF THE INVENTION

With the above in mind, it is the primary object of the invention to provide a crop-harvesting implement having a main frame and a harvester mounted thereon and to provide high-energy and low-energy hydraulic cylinders for raising and lowering the harvester. The hydraulic circuit for the cylinders includes a first valve controlled by a ground feeler which automatically adjusts the low-energy cylinder in accordance with the ground level. The circuit also includes a second valve for adjusting the high-energy cylinder and which is connected to respond to vertical adjustment of the harvester by the low-energy cylinder beyond a given vertical range to effect automatic raising and lowering of the harvesting unit by the high-energy cylinder.

It is also a primary object of the present invention to provide an automatic self-positioning harvester which utilizes a suspension mechanism for the individual row units that permits them to rock about a transverse horizontal axis. Provided on the units are ground feelers or shoes which operate valves controlling hydraulic cylinders which rock the units about the transverse axis. The shoes are supported on the forward ends of the units and the transverse axis is generally in the location of the fore-and-aft midpoint between the front and rear ends of the units. The valve control for the stabilizer reacts to variation in the ground level or to obstructions on the ground to adjust the hydraulic cylinder to rock the unit on the axis. Thus, the unit, if it contacts an obstruction, will raise at its forward end until it passes the obstruction, due to the ground shoe engaging the obstruction, and then will return to the desired ground level after the obstruction has passed. To a degree therefore, the unit actually "walks" over the obstruction. The work required to adjust a hydraulic cylinder for rocking the unit around its horizontal axis is, of course, minimal, and due to the small load on the cylinder, the heat buildup is quite low.

It is a further object of the present invention to provide with the aforedescribed stabilizer mechanism which automatically rocks the units about their axes a linkage to the main valve control of the unit. The main valve control operates hydraulic cylinders which raise and lower the supports for the cotton harvesters. The supports, as mentioned previously, carry the structure defining the transverse horizontal axis. The connection between the stabilizing units and the main valve has a lost motion which permits the main valve to remain at neutral for a considerable rocking action of the units. However, should the units be tilted above or below a given operating range, the linkage connecting the stabilizer to the main valve will operate to shift the valve into its raised or lowered position depending upon the direction of tilt of the unit. This will cause the units to reestablish a position relative to the ground whereby the feeler may again operate as a simple control for the rocking motion of the units.

DESCRIPTION OF THE PREFERRED EMBODIMENT

Figure 1:
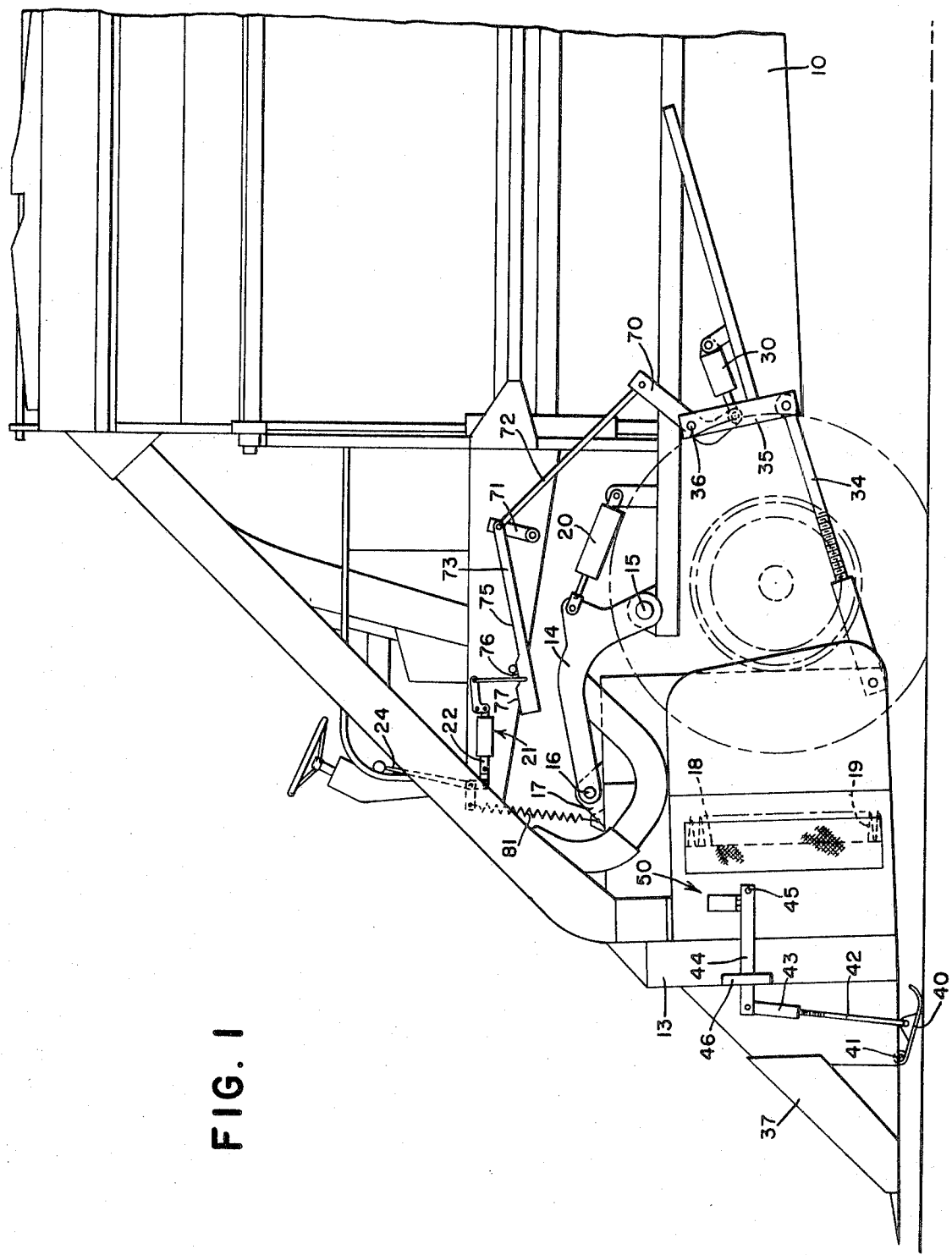
FIG. 1 is a schematic view of a cotton harvester with portions thereof shown in phantom so that the height-sensing mechanism may be superimposed thereon.

Referring now to the drawings, the height-sensing or automatic height control for the harvesting implement is provided in combination with a cotton harvester. However, it should be understood that other types of harvesters could advantageously utilize the present invention and there is no intention to limit its use only to a cotton harvester. The cotton harvester has a main tractor portion 10 supporting a basket 11 on its rear end, an operator's station 12 on the forward end and, more or less in cantilever fashion forwardly of the tractor, a pair of harvesting units 13.

The units 13 are suspended on the main frame of the tractor 10 by means of L-shaped lift arms 14 pivotally mounted at their rear ends on pivot rods 15 carried on the tractor. The arms 14 extend forwardly and suspend the units 13 at the fore-and-aft intermediate portion on a transverse pivot structure 16 that extends through suitable brackets 17 on the respective units 13. Thus, the arms 14 serve as supporting structure for the units 13 and carry transverse horizontal pivot structure 16 that permits the units to rock fore-and-aft on the supporting structure. Provided in each of the units and on opposite sides of a row of plants over which the harvesting units will move are harvesting drums, one of which is indicated at 18. The drums 18 have laterally extending spindles 19 that project into the passage and contact-ripened cotton bolls on the plant for removing them from the plant. The drums 18 rotate about an upright axis. It should here be noted that since the drums 18 are mounted substantially at the fore-and-aft midpoint of the units 13, and since the transverse pivot 16 is substantially at the same location, there would not be considerable vertical movement of the spindles 19 due to rocking motion of the unit 13 about the axis 16.

Means for rocking the unit 13 about the transverse axis 16 is provided by means of a primary power unit in the form of a low-energy hydraulic cylinder 30, anchored to the frame of the tractor 10 and connected to a rock arm 35, carried on a rock shaft 36 and connected at its lower end to the rear end of the picker unit 13 by means of a link 34. The link 34 extends between the lower end of the rock arm 35 and the rear end of the unit 13. It is clearly obvious from viewing FIG. 1, extension of the cylinder 30 causes the forward or gatherer end 37 of the unit 13 to rise and the rear end of the unit to lower. Retraction of the cylinder 30, of course, causes the forward end 37 to lower and the rear end of the unit 13 to rise.

The lift arms or supporting structure 14 are raised and lowered by means of a secondary hydraulic cylinder 20 having a main control valve 21. The main valve 21 has a spool structure 22 therein that has its forward end connected to a bellcrank 23 and the bellcrank 23 has a fore-and-aft extending arm connecting to a manual control lever 24. Details of the valve and the entire control mechanism therefor will be explained in detail, but it should be recognized that the control lever 24 may move the valve spool 22 to positions of neutral, in which the harvesting unit is not raised or lowered, a raised position in which the harvesting unit is raised, and a lowered position in which the unit is lowered.

Figure 2:
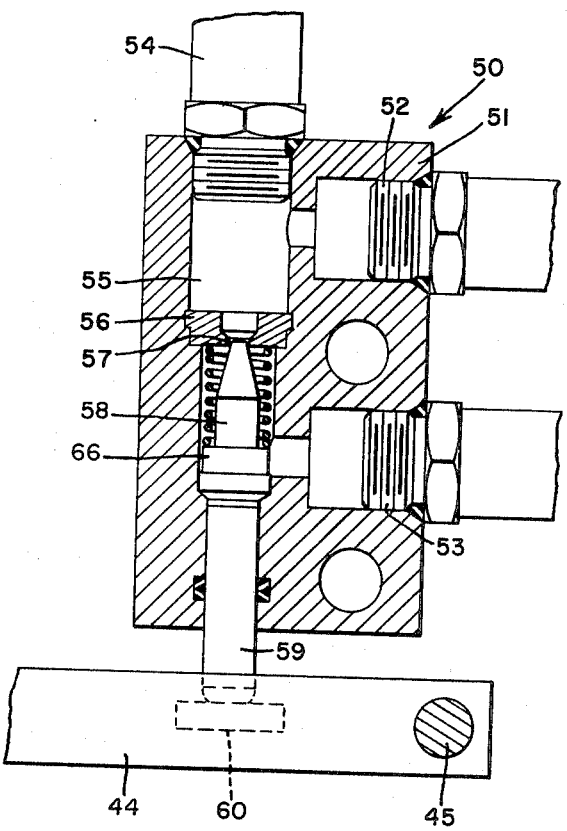
FIG. 2 is a sectional view of the secondary valve which operates the cylinders for rocking the units.

Pivoted at 41 to move vertically on the forward end of the unit 13, adjacent the gatherer 37, is a shoe or ground feeler 40. A rod 42 and a turnbuckle adjustment 43 therein extends from the shoe 40 to the forward end of lever 44 that has its rear end pivotally mounted at 45 to move vertically. A guide 46 is provided on the unit 13 for guiding the lever 44 in a vertical direction. Supported on the unit 13 above the lever 44 and adjacent the pivot 45 is a hydraulic variable orifice-type adjusting valve 50. Referring now to FIG. 2, the valve 50 includes a housing 51 having a pump inlet 52, a return outlet 53 and a working outlet 54 that feeds fluid from the housing 51 to the stabilizer cylinder 30. The inlet 52 and outlets 53, 54 are joined by a common chamber 55. A restrictor 56 having an orifice 57 is provided in the chamber 55. Closing the orifice 57 is a valve spindle 58 that has a downwardly projecting portion 59 extending from the housing 51. The outer end 59 engages a lug 60 mounted on the lever 44.

A spring 65 extends between a shoulder 66 on the spindle 58 and the restrictor 56. The spring 65 biases the spindle end 59 against the lug 60.

In operation, the valve 50 opens and closes to operate in accordance with the ground level beneath the respective units 13. The shoe 40 rides against the ground and upon engagement with a high spot on the ground, lifts the lever 44 and spindle 58 to thereby close the orifice 57. This causes fluid from the pump to pass through the outlet 54 into the primary low-energy cylinder 30 and causes the forward end of the unit 13 to rise. After the shoe has passed over the high spot, it will drop with respect to the unit 13 and cause the lever 44 to lower and the spindle 58 to open the orifice 57. The fluid will then move through the chamber 55 and into the return 53. Normally, the spindle 58 rests slightly open adjacent the restrictor 56 so that fluid passing through the inlet 62 returns to the reservoir through opening 64. This maintains the cylinder 30 in a substantially stabilized condition. It should here be noted that the work or force required to rock the entire unit 13 about the transverse horizontal pivot 16 is relatively small and consequently the amount of fluid required and the pressure required to operate the one-way cylinder 30, which is relatively small, is very little. Therefore, there will be very little heat buildup in the valve 50 as well as the cylinder 34.

The shoe 40 senses the ground level with respect to the units 13 and the unit valve 50 and its stabilizer cylinder 30 responds by rocking the unit 13 about the horizontal pivot 16. Consequently, the forward end 37 of the unit 13 tends to rise as the shoe hits a small rise or obstruction on the ground. Following contact with the obstruction the shoe drops and causes or permits the forward end of the unit 13 to drop to its normal position. Should the unit 13 pass over a low area, the shoe will tend to drop and the reaction through the valve 50 will cause the cylinder 30 to retract which will permit the forward end 37 to lower itself. Since the spindles 19 are substantially below the pivot 16, the drum 18 as well as its spindles 19 will not have a sharp rise through the plants which could damage them.

Referring again to FIG. 1, there is provided control means for the secondary valve 22 that includes a second rock arm 70 supported on rockshaft 36 and connected to an upper rock arm 71 by a link 72. Also connected to the rock arm 71 is a cam member or rod 73 that shifts fore-and-aft in response to rocking motion of the arm 71. Fixed to the tractor frame is a transverse cam rod or follower 74. The cam member 73 is provided with three zones in the form of horizontal surfaces 75, 76, 77 that ride against the underside of the rod 74 and correspond to the raised, neutral and lower positions of valve 22. The cam member is also connected by a rod 78 to one leg of a bellcrank 79, the opposite leg of which is connected to a push rod 82 that bears against the spool 22 of the main valve 21. As previously mentioned, the forward end of the spool 22 is connected to the vertical leg of a bellcrank 23. An opposite forwardly extending leg 80 has a spring 81 connected thereto that extends downwardly and is connected at its lower end to an upper side of the row unit 13. The spring maintains tension in the linkage to the cam 73 and retains contact between the cam rod 74 and one of the surfaces 75–77 of the cam member 73. However, since the spring 81 is connected to the unit 13, upon the unit being raised to transport the tension will be relieved and the spool valve 22 be permitted to return to neutral, a spring, not shown, being provided to bias it to neutral.

Figure 4:
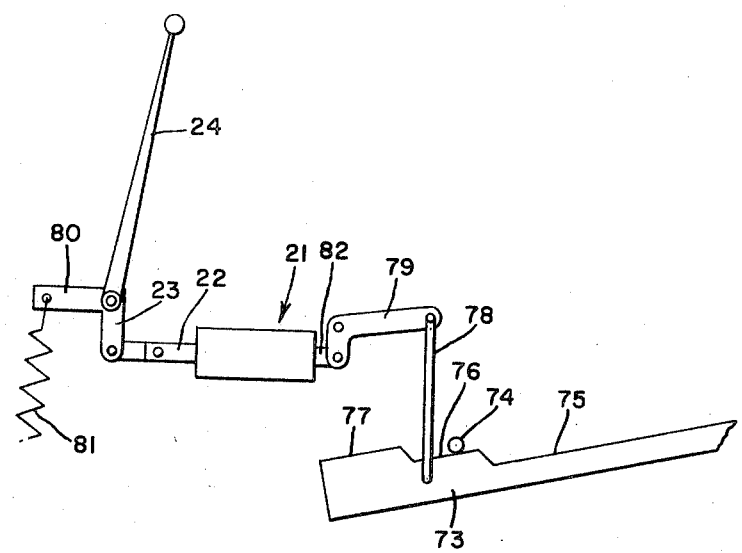
FIG. 4 is an enlarged schematic view of the cam control in the main valve which operates the main cylinders for the cotton picker.
Figure 3:
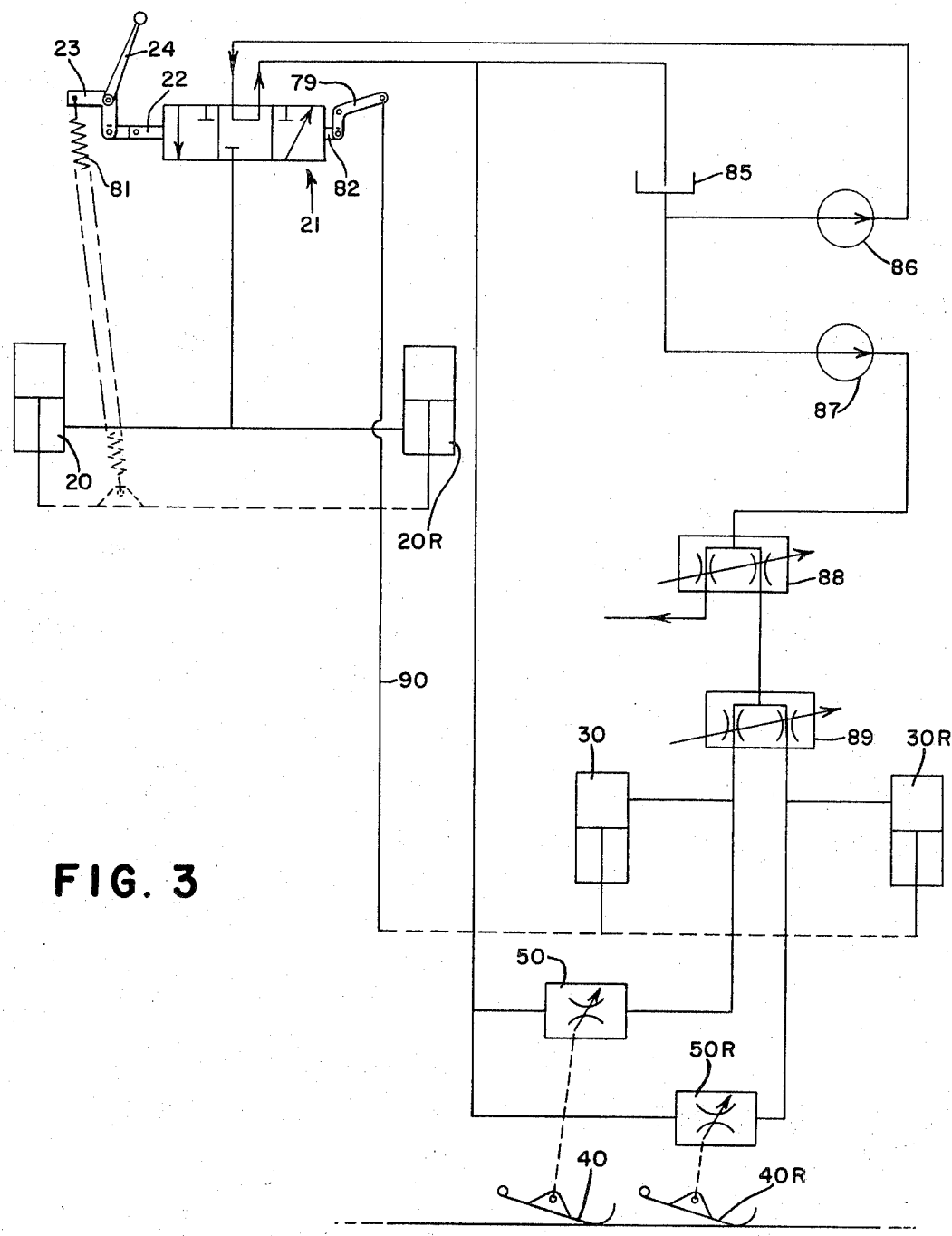
FIG. 3 is a schematic view of the hydraulic system contemplated in the present invention.

Referring now to FIG. 3 for the schematic view of the hydraulic circuit means for the cotton harvester, it should be recognized that for each cotton harvester there is conventionally a left-hand and right-hand harvesting unit. Since the left-hand unit has been described relative to FIGS. 1, 3 and 4, reference denoting the right-hand unit will be the same with the additional identification of R. A fluid level is maintained in a reservoir 85. Fluid moves from the reservoir through a large-capacity pump 86 and a low-capacity pump 87. Specifically, the large pump 86 has a capacity of about 10 gallons per minute whereas the small pump 87 has a capacity of 4 gallons per minute. Fluid from the low-capacity pump 87 moves through a flow divider 88 and fluid is metered out from the divider 88 to a power steering hydraulic system, not shown, and to a second flow divider valve 89 which divides the movement of fluid equally between the primary left-hand and right-hand stabilizer cylinders 30, 30R. Fluid is metered into the respective stabilizer cylinders 30, 30R through the primary variable orifice valves 50, 50R which are of the type previously described and shown in FIG. 3. Ground feelers or shoes 40, 40R are provided for the respective variable orifice valves 50, 50R.

Fluid from the high-capacity pump 86 moves to the main or secondary valve 21 which may be shiftable to permit the fluid to return to reservoir, or to retract the secondary cylinders 20, 20R for purposes of raising the respective units or to a position in which the units are permitted to be lowered by their weight and the respective cylinders 20, 20R extended. The control linkage 70–79 for operating the secondary valve 22 via either of the stabilizer cylinders 30, 30R is indicated in its entirety by the reference number 90.

The system functions as follows: Assuming the operator is entering a field and the units 13 are in their transport position, which occurs when the hydraulic cylinders 20, 20R are fully retracted, the operator actuates the unit lift lever 24 to lower the picking units. The units lower until the sensing shoes 40, 40R contact the ground which restricts the oil flowing through the restrictor valves 50, 50R. The pressure buildup due to the restrictor valve causes the respective stabilizer rockshaft cylinder 30 or 30R to actuate. The control linkage 90 moves the cam 73 to a neutral position in which the rod 74 rests on the neutral zone 76. Thus, the length of the cam zone 76 operates as a range of movement or operation that the stabilizer cylinders 30, 30R may adjust the units about their respective pivots 16 without effecting movement of the main control valve 21. This causes the spool 22 to move to its neutral position. As the ground contour varies, the sensing shoes 40, 40R vary the restriction of the valves 50, 50R which varies the position of the stabilizer cylinders 30, 30R for the respective units. Increasing ground height increases the restriction which causes the cylinders 30, 30R to retract causing the front of the respective units 13 to pivot upward about their respective pivots 16. Lower ground height, of course, has the opposite effect on the respective units 13. Thus, as the ground contour varies, the units 13 pivot about their horizontal pivots 16.

The operation of the hydraulic system is completely automatic. The operator merely moves the lever 24 to the lower position and the units lower until the sensing shoes 40, 40R require that the units stop lowering. From then on, the units 13 pivot about the lift arm attaching pivots 16. Thus, should a small obstruction be passed over, one or both of the shoes 40, 40R will operate its respective valve 50, 50R to raise the front end of the unit until the shoes 40, 40R pass over the obstruction and the valves 50, 50R are adjusted. Consequently, for small obstructions or small depressions in the ground level, the units 13 merely rock about their pivots to compensate. Should the cylinders 30, 30R be extended or retracted to their maximum or beyond what is considered a normal operating range, the cam 75 will adjust itself through the linkage 90 to raise or lower, as the case would require, the entire harvesting unit by extending or retracting the main left cylinders 20, 20R.

When it is desired to move the unit to a raised or transport position, the lever 24 is adjusted. Since the spring 81 is connected to the unit 13, raising of the latter will remove tension in the spring. Also, raising of the unit 13 causes the ground feelers 40 to drop and retract the cylinders 20, 20R which in turn causes the push rod 82 to move rearward. Therefore, since there is no tension in the spring 81 and the rod 82 is moved to its maximum rearward position, the spring-loaded spool 22 will be shifted to its neutral position, thereby permitting the operator to release the lever 24 when the unit 13 reaches transport position.

We claim:

1. A cotton harvester having a main frame, a main suspension means on the frame; a cotton harvesting unit having a forward end and a rear end and mounted on the suspension means to rock about a transverse horizontal axis; a main hydraulic motor connected to said frame and suspension means for raising and lowering the latter; a hydraulic motor connected to the unit and frame for rocking said unit about said axis to raise the lower said front end; a main valve for said main motor shiftable between neutral, raise and lower zones; an adjusting valve for the hydraulic motor for rocking said unit; a ground-engaging feeler mounted on the harvesting unit to move vertically with respect to the unit in accordance to the ground surface and connected to said adjusting valve for shifting the latter to rockably raise and lower said forward end as the feeler moves over high and low ground levels respectively; and valve control mechanism responsive to raising and lowering of the forward end about the transverse horizontal axis and connected to the main valve to shift the main valve from its neutral to its raise and lower zones in response to said forward end moving above or below respectively a predetermined vertical range.

2. A cotton harvester having a main frame, a main suspension means on the frame; a cotton harvesting unit having an upright rotatable harvesting drum with laterally extending and vertically spaced rows of spindles thereon and forward and rear ends and mounted on the suspension means to rock about a transverse horizontal axis above the drum; a main hydraulic motor connected to said frame and suspension means for raising and lowering the latter; a hydraulic motor connected to the unit and frame for rocking said unit about said axis to raise and lower said front end; a main valve for said main motor shiftable between neutral, raise and lower zones; an adjusting valve for the hydraulic motor for rocking said unit; a ground-engaging feeler mounted on the harvesting unit to move vertically with respect to the unit in accordance to the ground surface and connected to said adjusting valve for shifting the latter to rockably raise and lower said forward end as the feeler moves over high and low ground levels respectively; and valve control mechanism responsive to raising and lowering of the forward end about the transverse horizontal axis and connected to the main valve to shift the main valve from its neutral to its raise and lower zones in response to said forward end moving above or below respectively a predetermined vertical range.

3. A harvester comprising: a main mobile frame, a harvesting unit; supporting structure carried on the frame for vertical movement and rockably supporting the harvesting unit to swing vertically about a horizontal transverse axis; a main power means for raising and lowering the structure including a control therefor; a second power means connected to the unit for rocking the unit about said axis and including a second control therefor shiftable to cause said second power means to rock said unit clockwise and counterclockwise about the axis to raise and lower portions of the unit; a ground-engaging member supported on the unit for vertical movement and operatively connected to the second control to rockably raise and lower said unit about said axis in accordance with the member's vertical position with respect to the unit; and means responsive to adjustment of the unit about the axis and connected to said control for the main power means for adjusting the latter control out of neutral position to raise and lower positions in response to said unit moving on said axis above and below respectively a predetermined range of vertical adjustment by said second power means, and to return to said neutral position upon the unit moving within said range.

4. A harvester comprising: a main mobile frame, a harvesting unit rockably supported on the frame to swing vertically about a horizontal transverse axis; a main power means for raising and lowering the unit including a control therefor adjustable between raise, lower, and neutral positions; a second power means connected to the unit for rocking the unit about said axis and including a second control therefor shiftable to cause said second power means to rock said unit clockwise and counterclockwise about the axis to raise and lower portions of the unit; a ground-engaging member supported on the unit for vertical movement and operatively connected to the second control to rockably raise and lower said unit about said axis in accordance with the member's vertical position with respect to the unit; and means responsive to adjustment of the unit about the axis and connected to said control for the main power means for adjusting the latter control out of neutral position to raise and lower positions in response to said unit moving on said axis above and below respectively a predetermined range of vertical adjustment by said second power means, and to return to said neutral position upon the unit moving within said range.

5. A harvester comprising: a main mobile frame, a harvesting unit rockably supported on the frame to swing vertically about a horizontal transverse axis; a high-energy hydraulic motor for raising and lowering the unit including a control therefor adjustable between raise, lower, and neutral positions; a low-energy hydraulic motor connected to the unit for rocking the unit about said axis and including a second control therefor shiftable to cause said low-energy hydraulic motor to rock said unit clockwise and counterclockwise about the axis to raise and lower portions of the unit; a ground-engaging member supported on the unit for vertical movement and operatively connected to the second control to rockably raise and lower said unit about said axis in accordance with the member's vertical position with respect to the unit; and means responsive to adjustment of the unit about the axis by said low-energy motor and connected to said control for the high-energy motor for adjusting the latter control out of neutral position to raise and lower positions in response to said unit moving on said axis above and below respectively a predetermined range of vertical adjustment by said low-energy motor, and to return to said neutral position upon the unit moving within said range.

6. A harvester comprising: a main mobile frame, a harvesting unit supported on the frame to move vertically; a high-energy hydraulic motor for raising and lowering the unit including a control therefor adjustable between raise, lower, and neutral positions; a low-energy hydraulic motor connected to the unit for vertically adjusting the unit and including a second control therefor; a ground-engaging member supported for vertical movement and operatively connected to the second control to raise and lower said unit in accordance with the ground level; and means responsive to adjustment of the unit by said low-energy motor and connected to said control for the high-energy motor for adjusting the latter control out of neutral position to raise and lower positions in response to said unit moving above and below respectively a predetermined range of vertical adjustment by said low-energy motor, and to return to said neutral position upon the unit moving within said range.

7. The harvester as set forth in claim 6 further characterized by a manual control connected to and for independent adjustment of the control for the high-energy hydraulic motor.

8. The harvester as set forth in claim 6 in which the control for the high-energy motor is a hydraulic valve adjustable to the aforesaid raise, lower and neutral positions, and the means responsive to adjustment of the unit includes a cam connected to and shiftable in response to vertical movement of the unit, said cam having three zones corresponding to the raise, lower, and neutral positions respectively of the valve, and said cam being operatively connected to the valve to adjust the valve to its respective positions.

9. The structure as set forth in claim 6 in which the harvesting unit is supported on the frame on a transverse horizontal pivot, and the high-energy motor raises and lowers the pivot on the frame; and the low-energy motor rocks the unit on the pivot.

10. The structure as set forth in claim 9 in which the harvesting unit has a forward end and harvesting mechanism rearwardly of the forward end, the pivot is above the harvesting mechanism and the ground feeler is adjacent the forward end and forwardly of the harvesting mechanism.

11. The harvester as set forth in claim 9 in which the high-energy motor is a hydraulic cylinder of a given diameter and the low-energy hydraulic motor is a hydraulic motor of small diameter.

12. A crop-harvesting implement comprising: a main frame; a harvester having front and rear ends and supported on the frame to swing vertically about a horizontal axis; a low-energy hydraulic motor connected to the harvester for rocking the harvester about its pivot so as to vertically adjust the front end of the harvester; a primary hydraulic circuit including an adjustable valve for operating the hydraulic motor; ground feeler means on the harvester operatively connected to the valve for effecting vertical adjustment of the harvester in accordance with ground level; power means including a high-energy hydraulic motor between the harvester and frame for raising and lowering the harvester; a secondary hydraulic circuit including an adjustable valve for operating the high-energy hydraulic motor; and control means connected to the adjustable valve for the high-energy hydraulic motor and responsive to raising and lowering of the harvester by said low-energy hydraulic means above and below a given vertical range above the ground level to effect operation of said high-energy hydraulic motor to raise and lower the harvester.

13. A crop-harvesting implement comprising: a main frame; a harvester supported on the frame to move vertically; first power means including a low-energy hydraulic motor connected to the harvester for vertically adjusting the harvester; a primary hydraulic circuit including an adjustable valve for operating the hydraulic motor; ground feeler means on the harvester operatively connected to the valve for effecting vertical adjustment of the harvester in accordance with ground level; second power means including a high-energy hydraulic motor between the harvester and frame for raising and lowering the harvester; a second hydraulic circuit including an adjustable valve for operating the high-energy hydraulic motor; and control means connected to the adjustable valve for the high-energy hydraulic motor and responsive to said low-energy hydraulic motor raising and lowering the harvester above and below a given vertical range to effect operation of said high-energy hydraulic motor.

14. A crop-harvesting implement comprising: a main frame; a harvester supported for vertical movement on the frame; a primary low-energy and a secondary high-energy hydraulic motor connected to the harvester for vertically adjusting the harvester; hydraulic circuit means including a primary adjustable valve for operating the primary hydraulic motor and a secondary adjustable valve for operating the secondary hydraulic motor; ground feeler means operatively connected to and for adjusting the primary valve to effect vertical adjustment of the harvester by said primary hydraulic motor in accordance with ground level; and control means connected to the secondary adjustable valve and responsive to said primary hydraulic motor raising and lowering the harvester beyond a given vertical range to effect operation of said high-energy hydraulic motor.

15. A crop-harvesting implement comprising: a main frame; a harvester having front and rear ends and supported on the frame to swing vertically about a horizontal axis; first power means extending between the frame and harvester for rocking the harvester about its pivot so as to vertically adjust the front end of the harvester; ground feeler means on the harvester and connected to the power means for effecting adjusting of the power means in accordance with ground level; second power means between the harvester and frame for raising and lowering the harvester; and control means connected to the second power means and responsive to raising and lowering of the harvester by said first power means above and below a given operating range to effect operation of said second power means to raise and lower the harvester.

16. The crop harvester as set forth claim 15 further characterized by adjusting means between the ground feeler means and the first power means for adjusting the vertical position of the ground feeler means.

17. The crop harvester as set forth in claim 15 in which the ground feeler means includes a ground-engaging member vertically movably mounted on the harvester and having a ground-engaging portion spaced vertically beneath an underside of the harvester and further characterized by the ground feeler means being connected to the power means by an adjustment that adjusts the ground-engaging portion vertically with respect to the underside of the harvester.

18. The crop harvester as set forth in claim 17 further characterized by a manual control connected to the second power means for raising and lowering the harvester to and from an upper transport position to and from a normal working position within the aforesaid operating range.

19. A cotton harvester having a main frame; a cotton harvesting unit having a forward end and a rear end; a suspension means mounted on the frame and overlying the harvesting unit and suspending the latter to rock about a transverse horizontal axis located above the harvester unit and between said forward and rear ends; a hydraulic cylinder connected to said frame and suspension means for raising and lowering the latter; a hydraulic motor connected to the unit and frame for rocking said unit about said axis to raise and lower said front end; a manually controlled valve for said cylinder shiftable between neutral, raise and lower zones; a control valve for said second cylinder; a ground-engaging feeler mounted on the harvestering unit adjacent its forward end to move vertically with respect to the unit in accordance to the ground surface and connected to said control valve for shifting the latter to rock the harvesting unit and to raise and lower said forward end as the feeler moves over high and low ground levels respectively; and valve control mechanism responsive to raising and lowering of the forward end about the transverse horizontal axis and connected to the manually controlled valve to shift the valve from its neutral to its raise and lower zones in response to said forward end moving above or below respectively a predetermined vertical range.

20. A harvester comprising: a main mobile frame, a harvesting unit supported on the frame to move vertically; a high-energy hydraulic motor for raising and lowering the unit including a valve therefor reciprocally adjustable in opposite directions between raise, lower, and neutral positions; a low-energy hydraulic motor connected to the unit for vertically adjusting the unit and including a control therefor; a ground-engaging member supported for vertical movement and operatively connected to the control to raise and lower said unit in accordance with the ground level; linkage means responsive to adjustment of the unit by said low-energy motor and connected to said valve and adjusting the valve out of neutral position to raise and lower positions in response to said unit moving above and below respectively a predetermined range of vertical adjustment by said low-energy motor, and to return to said neutral position upon the unit moving within said range; and spring connected to said valve biasing said valve in one direction and being responsive to vertical adjustment of said unit to a raised position to relieve the bias.

* * * * *

UNITED STATES PATENT OFFICE
CERTIFICATE OF CORRECTION

Patent No. 3,643,407      Dated 22 February 1972

Inventor(s) Arthur Lowell Hubbard and Leon Franklin Sanderson

It is certified that error appears in the above-identified patent and that said Letters Patent are hereby corrected as shown below:

Column 5, line 36, after "raise" change "the" to -- and --.

Column 7, line 64, before "hydraulic" change "second" to -- secondary --.

Column 10, line 3, after "and" insert -- a --.

Signed and sealed this 13th day of March 1973.

(SEAL)
Attest:

EDWARD M. FLETCHER, JR.
Attesting Officer

ROBERT GOTTSCHALK
Commissioner of Patents